(No Model.)  
S. A. GRANT.  
BICYCLE.  
No. 520,396. Patented May 22, 1894.  
2 Sheets—Sheet 2.
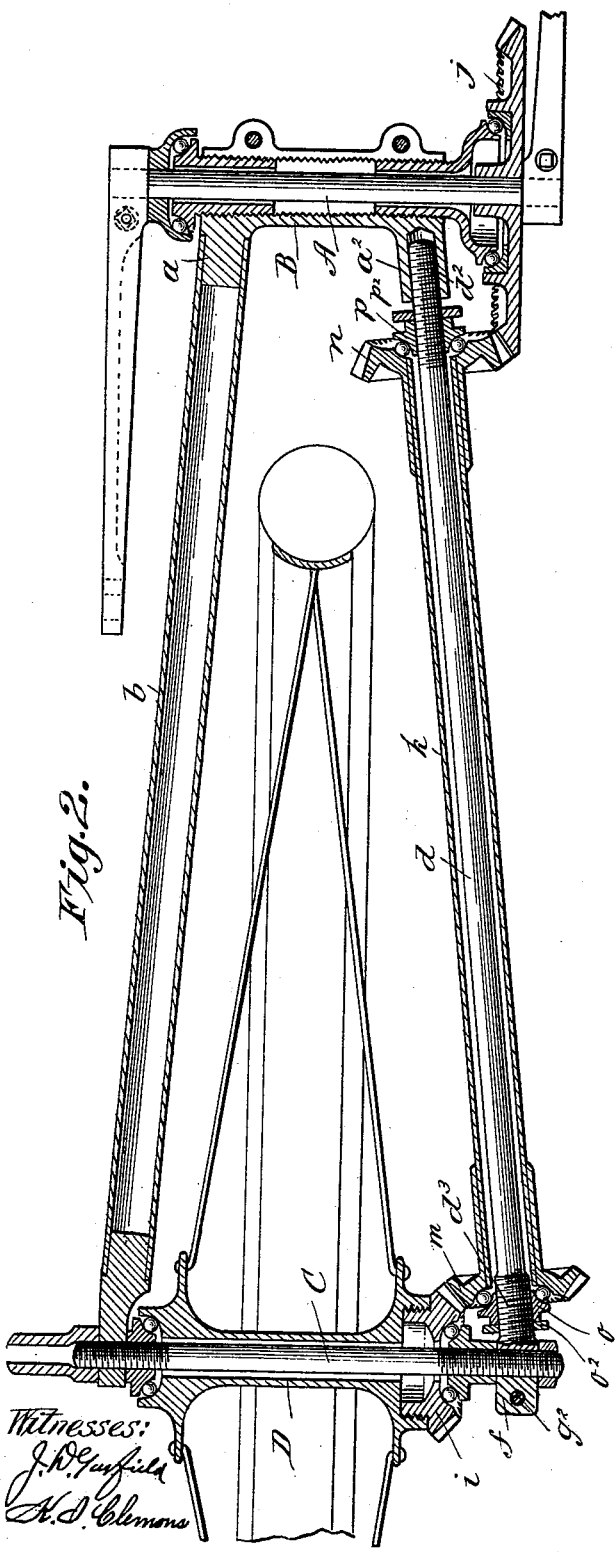
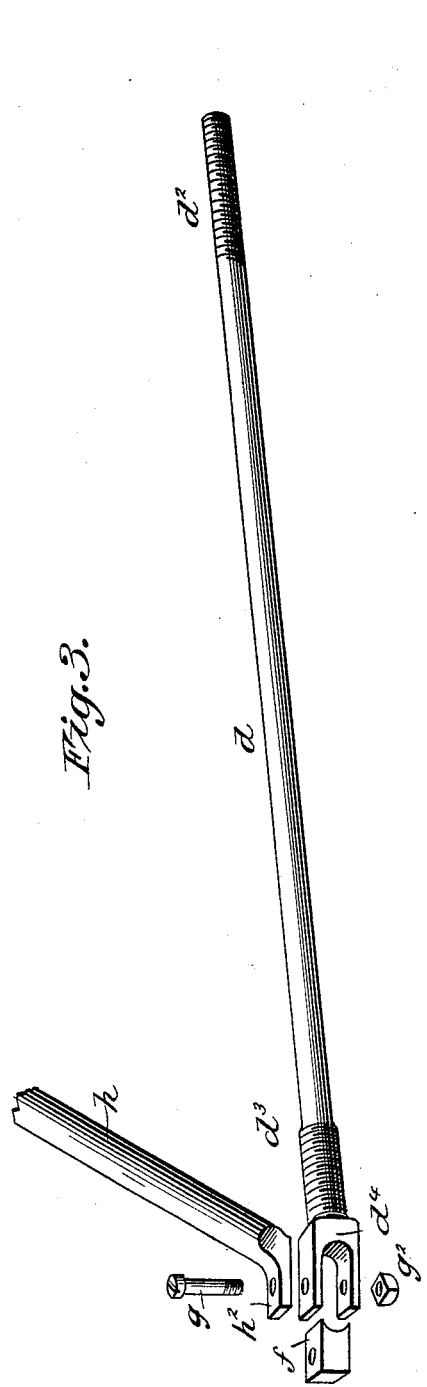
Witnesses:  
Inventor:  
Sidney A. Grant,  
by Attorneys

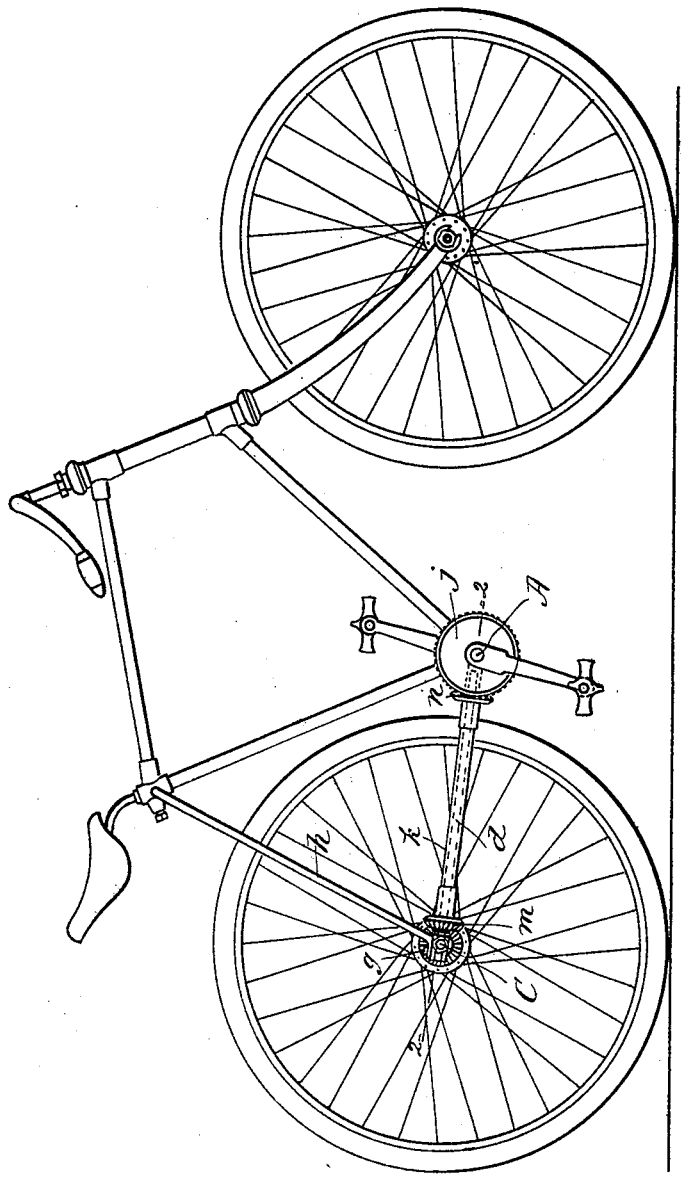

UNITED STATES PATENT OFFICE.

SIDNEY A. GRANT, OF SPRINGFIELD, ASSIGNOR TO THE NATIONAL CYCLE COMPANY, OF FITCHBURG, MASSACHUSETTS.

BICYCLE.

SPECIFICATION forming part of Letters Patent No. 520,396, dated May 22, 1894.

Application filed November 22, 1893. Serial No. 491,689. (No model.)

*To all whom it may concern:*

Be it known that I, SIDNEY A. GRANT, a citizen of the United States, residing at Springfield, in the county of Hampden and State of Massachusetts, have invented new and useful Improvements in Bicycles, of which the following is a specification.

This invention relates to improvements in bicycles of the class set forth in the Letters Patent of the United States granted to me November 21, 1893, No. 509,079; the object being to simplify the construction of the gear driving connections and to render the parts stronger and cheaper; and to these ends the invention consists in constructions and combinations of parts all substantially as will hereinafter fully appear and be set forth in the claims.

The improvements are fully and clearly illustrated in the accompanying drawings, Figure 1 being a side elevation of the bicycle with driving gears and the improved connections thereon. Fig. 2 is a horizontal sectional view on a larger scale taken on the line 2—2, Fig. 1. Fig. 3 is a perspective view of the stay-rod and parts to which it is connected, all to be hereinafter referred to.

Similar letters of reference indicate corresponding parts in all of the views.

In the drawings, A represents the crank axle mounted, as usual, in the "bracket," B, which is equipped with suitable ball bearing parts, and the bracket is provided with the rearwardly extended lugs, $a$, $a^2$.

C represents the fixed rear wheel axle on which the hub, D, of the rear wheel is mounted for rotation. The axle is supported on what may be regarded as the rear fork legs of the bicycle frame, the forward extremities of which have supporting engagements with the aforesaid bracket lugs. One, $b$, of said fork leg members is tubular and is comprised in the machine, substantially as in the aforesaid patent, while the other fork leg member, $d$, is a solid stay-rod, as seen in Figs. 2 and 3, and has its forward portion, $d^2$, screw-threaded; it is formed with the enlarged cylindrical and screw-threaded part, $d^3$, near its rear end, and has its rear end formed with the squared and bifurcated part, $d^4$, the space between the separated members thereof opening to the rear end of the said stay-rod. The forward end of the stay-rod screws into the screw-threaded socket-lug, $a^2$, of the bracket, and said rod receives the one end portion of the rear wheel axle within the inner boundaries of the space within the part, $d^4$. The block, $f$, with the concaved forward edge sets closely between the extremities of the members of said bifurcated part and is held by the bolt and nut, $g$, $g^2$, which is passed through the angularly turned rear end portion, $h^2$, of the rear upper oblique member, $h$, of the diamond frame, and through the perforations in the bifurcated part and said block. The hub of the rear wheel has the bevel gear wheel, $i$, thereon, and a bevel gear wheel, $j$, is also fixed on the crank-shaft. A tube, $k$, surrounds the said stay-rod and has at its ends the fixed bevel gears, $m$ and $n$, respectively, engaging with the gears, $i$ and $j$. Each of the gear wheels has its inner portion suitably cupped, or concaved, to receive the bearing of the balls which are between it and the cone, $o$, or $p$, screwing on the threaded portions of the shaft, the extremities of which cones serve as the direct parts of support for the gears, $m$, $n$, and the tube, $k$, connecting them.

In the assemblage of the novel parts of this bicycle the internally threaded cone (with its check-nut, $o^2$), is first slipped on at the forward end of the stay-rod and passed rearwardly to a screw engagement on and well to the rear of the screw enlargement, $d^3$. The tube and gears are next placed to surround the stay-rod and the cone for the forward gear (with its check nut, $p^2$,) is then placed on the threaded part, $d^2$. The stay-rod is then turned to screw engagement with the socket-lug, $a^2$, of the bracket, and then the rear wheel being brought to its bearing support the parts, $d$ and $f$, and $h^2$, are united by the bolt and nut, $g$, $g^2$.

In this bicycle it will be seen that the axle for the rear wheel and the crank-shaft bracket are strongly and rigidly united by the stay-rod, and that said rod forms adequate and practical supports for the adjustable annular parts or cones which impart the support to the gears, $m$, $n$, and the tubular connection, $k$.

Having thus described my invention, what I claim, and desire to secure by Letters Patent, is—

1. In a bicycle, the combination with a bracket, A, of a stay-rod having at its forward end a supporting connection with the bracket, and having at its rear end the bifurcated part, $d^4$, for constituting a one-end support for the rear wheel axle, and the rear oblique frame member, $h$, having the angular extremity, $h^2$, the block, $f$, and the bolt passed through perforations in said parts, $h^2$, $f$, and $d^4$, substantially as described.

2. In a bicycle, the combination with the rear wheel axle, and the bracket having the threaded socket-lug, $a^2$, and the rear wheel with the gear, $i$, and the crank-shaft with the gear, $j$, of the stay-rod having the screw-threaded portion, $d^2$, at its forward end,—partially entered in said socket-lug,—and having the enlarged screw-threaded portion, $d^3$, near its rear end and also having its rear end constructed for a one-end support of the rear wheel axle, the tube, $k$, surrounding the stay-rod and having the gears, $m$ and $n$, and meshing with the aforesaid gears, $i$, and $j$, the cone, $o$, screwing on the enlarged screw-threaded part of the stay-rod, $d^3$, and the cone, $p$, screwing on the threaded part, $d^2$, to the rear of the socket-lug, between which cones and the tube gears are comprised the balls, substantially as described.

SIDNEY A. GRANT.

Witnesses:
H. A. CHAPIN,
WM. S. BELLOWS.